(12) United States Patent
Hu (10) Patent No.: US 12,374,301 B2
(45) Date of Patent: Jul. 29, 2025

(54) DISPLAY DEVICES HAVING BRIGHTNESS COMPENSATION FUNCTION AND DRIVING METHODS THEREFOR

(71) Applicant: TCL CHINA STAR OPTOELECTRONICS TECHNOLOGY CO., LTD., Guangdong (CN)

(72) Inventor: Xiong Hu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 12 days.

(21) Appl. No.: 18/401,548

(22) Filed: Dec. 31, 2023

(65) Prior Publication Data

US 2025/0182708 A1 Jun. 5, 2025

(30) Foreign Application Priority Data

Dec. 4, 2023 (CN) .......................... 202311660929.2

(51) Int. Cl.
G09G 3/34 (2006.01)
G06T 5/50 (2006.01)
G09G 3/20 (2006.01)

(52) U.S. Cl.
CPC ............. *G09G 3/3406* (2013.01); *G06T 5/50* (2013.01); *G09G 3/2007* (2013.01); *G06T 2207/20208* (2013.01); *G09G 2320/0626* (2013.01)

(58) Field of Classification Search
CPC ............... G09G 3/3406; G09G 3/2007; G09G 2320/0626; G06T 5/50; G06T 2207/20208
See application file for complete search history.

(56) References Cited

U.S. PATENT DOCUMENTS

| 2020/0209642 | A1* | 7/2020 | Lakshminarayanan ...................... G09G 3/2018 |
| 2020/0211490 | A1* | 7/2020 | Hyun .................... G09G 3/2022 |
| 2020/0213512 | A1* | 7/2020 | Yasutomi ............. H04N 23/743 |

* cited by examiner

*Primary Examiner* — Sejoon Ahn
(74) *Attorney, Agent, or Firm* — PV IP PC; Wei Te Chung (57) ABSTRACT

The present disclosure provides a driving method for a display device and a display device. The driving method for the display device includes: obtaining a type of an initial backlight image according to received data of an image to be displayed, and obtaining an initial current value of the image to be displayed; judging whether the type of the initial backlight image is the same as a type of a preset backlight image, and whether a current difference between the initial current value and a target current value is greater than a preset threshold; and adjusting an initial brightness value of the image to be displayed to a target brightness value in a case where the type of the initial backlight image is the same as the type of the preset backlight image and the current difference is greater than the preset threshold.

20 Claims, 5 Drawing Sheets

DISPLAY DEVICES HAVING BRIGHTNESS COMPENSATION FUNCTION AND DRIVING METHODS THEREFOR

CROSS-REFERENCE TO RELATED APPLICATION

The present disclosure claims the priority to and benefit of Chinese Patent Application No. 202311660929.2, titled "DRIVING METHODS FOR DISPLAY DEVICES AND DISPLAY DEVICES USING THE DRIVING METHODS" filed on Dec. 4, 2023, the disclosure of which is incorporated herein by reference in its entirety.

TECHNICAL FIELD

The present disclosure relates to the field of display, and in particular, to driving methods for display devices and display devices using the driving methods.

BACKGROUND

Mini light-emitting diodes (Mini LEDs) are widely used as backlight sources for e-sports displays in the market due to their high brightness, high contrast, ultra-high resolution, and color saturation. Currently, the e-sports displays need to pass high-dynamic range (HDR) certification.

During the process of HDR certification, the e-sports displays need to display some special images, and display brightness of the special images at different grayscales needs to be in the standard range. Since the existing brightness correction methods for the e-sports displays generally involve adjusting the current or duty cycle, it is easy to appear that the current or duty cycle adjustment range is too large, resulting in lower or higher display brightness, and thus making it difficult to pass the HDR certification.

Therefore, improving accuracy of the brightness correction of the e-sports displays is a problem to be solved.

SUMMARY

On the one hand, embodiments of the present disclosure provide a driving method for a display device, which includes: obtaining a type of an initial backlight image according to received data of an image to be displayed, and obtaining an initial current value of the image to be displayed; judging whether the type of the initial backlight image is the same as a type of a preset backlight image, and whether a current difference between the initial current value and a target current value is greater than a preset threshold; and adjusting an initial brightness value of the image to be displayed to a target brightness value in a case where the type of the initial backlight image is the same as the type of the preset backlight image and the current difference is greater than the preset threshold.

On the other hand, embodiments of the present disclosure provide a display device including a display panel, a backlight module, and a driving circuit. The display panel and the backlight module are electrically connected to the driving circuit, and the driving circuit includes a detection module, a comparison module, and a compensation module; the detection module is electrically connected to the display panel and the backlight module, and configured to obtain a type of an initial backlight image according to received data of an image to be displayed and obtain an initial current value of the image to be displayed; the comparison module is electrically connected to the detection module and configured to judge whether the type of the initial backlight image is the same as a type of a preset backlight image, and whether a current difference between the initial current value and a target current value is greater than a preset threshold; and the compensation module is electrically connected to the display panel, the detection module, and the comparison module, and configured to adjust an initial brightness value of the image to be displayed to a target brightness value according to the target current value and to enable the display panel to display a target image according to the target brightness value in a case where the type of the initial backlight image is the same as the type of the preset backlight image and the current difference is greater than the preset threshold.

DETAILED DESCRIPTION

The following contents will provide a description of technical solutions in the embodiments of the present disclosure with reference to the drawings. The described technical solutions are intended to explain and illustrate core ideas of the present disclosure, and are not intended to limit the scope of protection of the present disclosure.

Figure 1A:
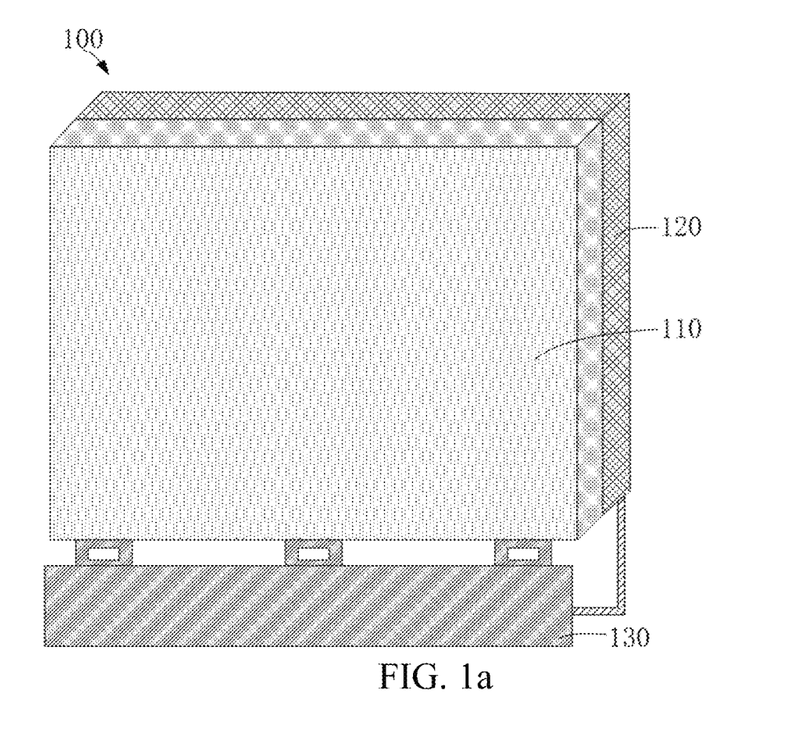
FIG. 1a is a schematic structural diagram of a display device provided by some embodiments of the present disclosure.

Referring to FIG. 1a, embodiments of the present disclosure provide a display device 100 that includes a display panel 110, a backlight module 120, and a driving circuit 130. Both of the display panel 110 and the backlight module 120 are electrically connected to the driving circuit 130.

In some embodiments of the present disclosure, the backlight module 120 includes multiple Mini LEDs.

Figure 1B:
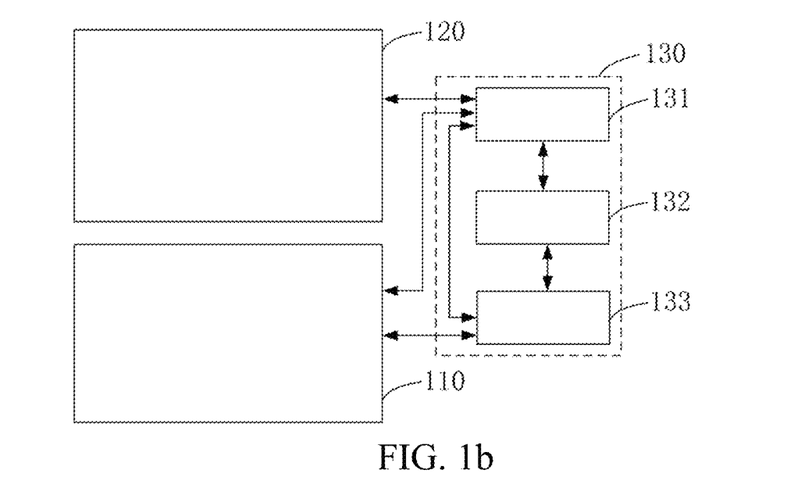
FIG. 1b is a schematic structural diagram of a driving circuit in a display device provided by some embodiments of the present disclosure.

Referring to FIG. 1b, the driving circuit 130 includes a detection module 131, a comparison module 132, and a compensation module 133.

The detection module 131 is electrically connected to the display panel 110 and the backlight module 120. The detection module 131 is configured to obtain a type of an initial backlight image according to received data of an image to be displayed, and obtain an initial current value of the image to be displayed.

The comparison module 132 is electrically connected to the detection module 131. The comparison module 132 is configured to judge whether the type of the initial backlight image is the same as a type of a preset backlight image, and whether a current difference between the initial current value and a target current value is greater than a preset threshold.

The compensation module 133 is electrically connected to the display panel 110, the detection module 131, and the comparison module 132. The compensation module 133 is configured to adjust an initial brightness value of the image to be displayed to a target brightness value according to the target current value and to enable the display panel to display a target image according to the target brightness value in a case where the type of the initial backlight image is the same as the type of the preset backlight image and the current difference is greater than the preset threshold.

In some embodiments of the present disclosure, the driving circuit 130 further includes a controlling module (not shown in the figures) electrically connected to the display panel 110, the detection module 131, and the compensation module 133. The controlling module is configured to turn on brightness compensation function when brightness compensation is needed, and turn off the brightness compensation function when brightness compensation is not needed. It can be understood that the controlling module is the module known for those skilled in the art, and thus the structure of the controlling module can refer to the prior art, which will not be repeated here.

In some embodiments of the present disclosure, the detection module 131 is configured to compare the type of the initial backlight image with the type of the preset backlight image, and the initial current value with the target current value simultaneously. If the type of the initial backlight image is different from the type of the preset backlight image, the detection module 131 does not generate a compensation signal, and thus the compensation module 133 does not adjust brightness of the display panel 110 without receiving the compensation signal. Similarly, if the current difference between the initial current value and the target current value is less than or equal to the preset threshold, indicating that the initial brightness value of the image to be displayed is within a preset range, in this case, the detection module 131 does not generate the compensation signal, and thus the compensation module 133 does not adjust brightness of the display panel without receiving the compensation signal.

In the display device provided in the above-mentioned embodiments of present disclosure, the detection module 131 is configured to obtain the type of the initial backlight image according to the received data of the image to be displayed, and obtain the initial current value of the image to be displayed; the comparison module 132 is configured to judge whether the type of the initial backlight image is the same as the type of the preset backlight image, and whether the current difference between the initial current value and the target current value is greater than the preset threshold; and the compensation module 133 is configured to adjust the initial brightness value of the image to be displayed to the target brightness value according to the target current value and to enable the display panel to display the target image according to the target brightness value in a case where the type of the initial backlight image is the same as the type of the preset backlight image and the current difference is greater than the preset threshold. Therefore, by the display device including the above modules, the display device of the present disclosure realizes higher accuracy in brightness correction of display images by adjusting the initial brightness value of the image to be displayed to the target brightness value according to the type of the preset backlight image and the target current value of the image to be displayed.

Figure 2:
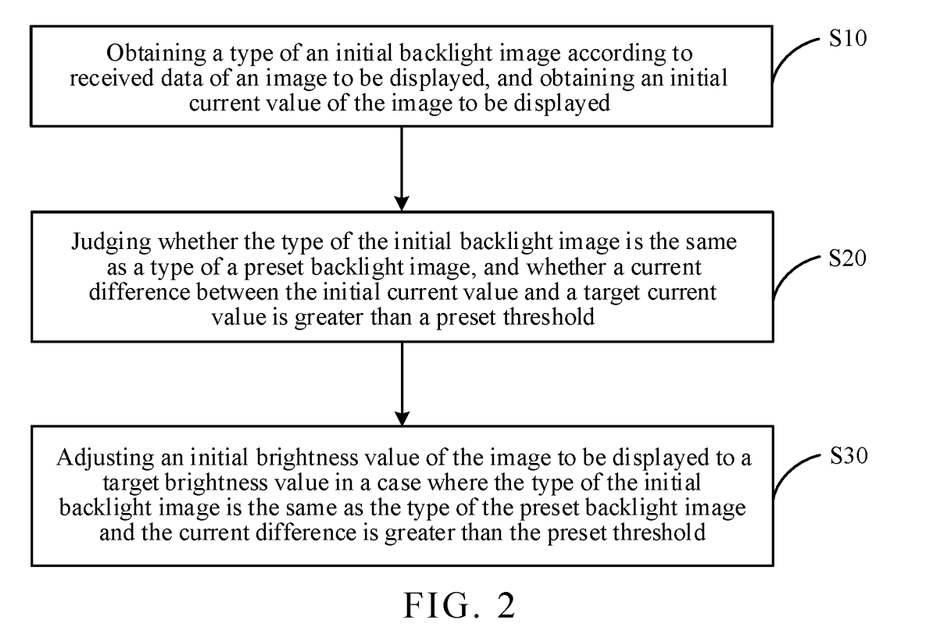
FIG. 2 is a flowchart of a driving method for a display device provided by some embodiments of the present disclosure.

Referring to FIG. 2, some embodiments of the present disclosure provide a driving method for a display device, which includes:

step S10, obtaining a type of an initial backlight image according to received data of an image to be displayed, and obtaining an initial current value of the image to be displayed;

step S20, judging whether the type of the initial backlight image is the same as a type of a preset backlight image, and whether a current difference between the initial current value and a target current value is greater than a preset threshold; and step S30, adjusting an initial brightness value of the image to be displayed to a target brightness value in a case where the type of the initial backlight image is the same as the type of the preset backlight image and the current difference is greater than the preset threshold.

Figure 3:
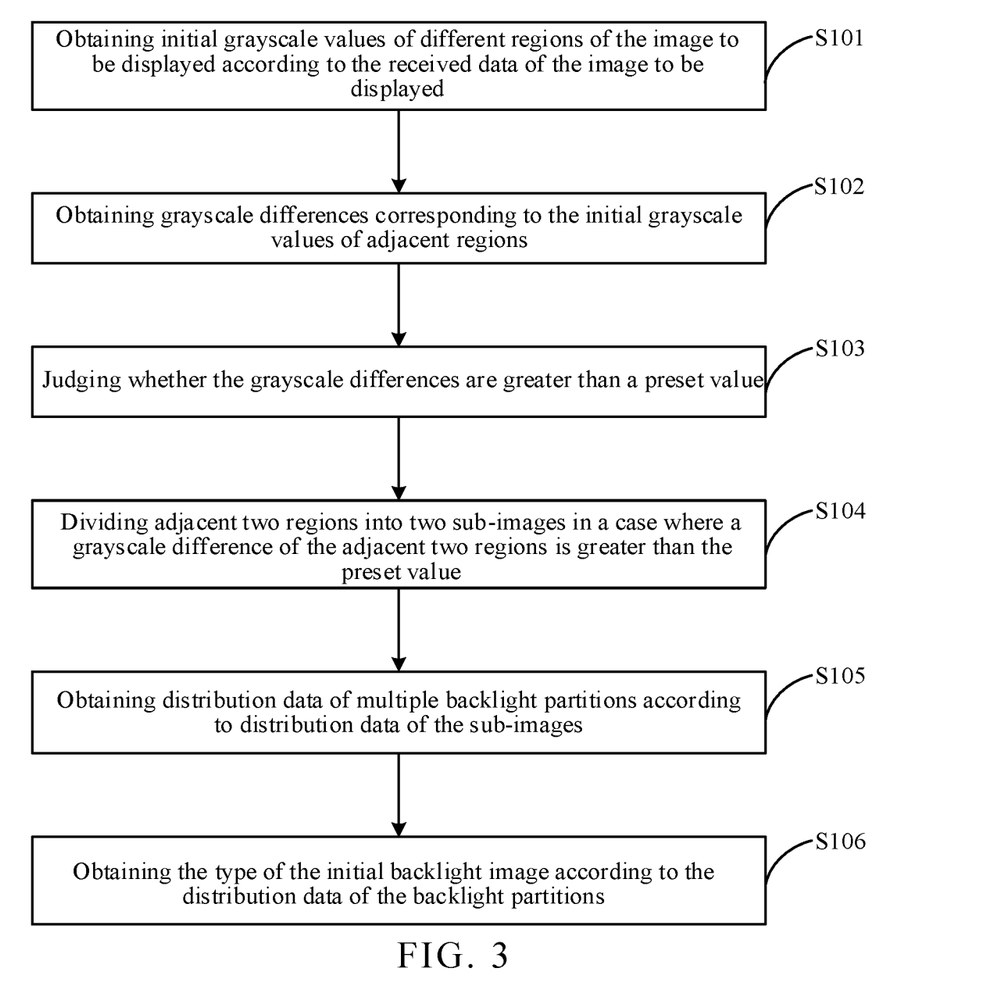
FIG. 3 is a flowchart of "obtaining a type of an initial backlight image according to received data of an image to be displayed" of step S10 in FIG. 2.

Referring to FIG. 3, in some embodiments, the step of obtaining the type of the initial backlight image according to the received data of the image to be displayed includes:

step S101, obtaining initial grayscale values of different regions of the image to be displayed according to the received data of the image to be displayed;

step S102, obtaining grayscale differences corresponding to the initial grayscale values of adjacent regions;

step S103, judging whether the grayscale differences are greater than a preset value;

step S104, dividing adjacent two regions into two sub-images in a case where a grayscale difference of the adjacent two regions is greater than the preset value;

step S105, obtaining distribution data of multiple backlight partitions according to distribution data of the sub-images; and step S106, obtaining the type of the initial backlight image according to the distribution data of the backlight partitions.

In some embodiments of the present disclosure, the step S101 includes: obtaining the initial grayscale value of each pixel unit corresponding to the image to be displayed according to the received data of the image to be displayed, and dividing the image to be displayed into multiple sub-images according to differences of the initial grayscale values of multiple pixel units.

In some embodiments of the present disclosure, the brightness compensation function is turned on according to the received data of the image to be displayed. In the present disclosure, based on the needs for HDR certification of e-sports displays, the e-sports displays need to display some special images, and display brightness of the special images at different grayscales needs to be in the standard range. In order to ensure that the display brightness of the special images at different grayscales is in the standard range, the brightness compensation function is turned on after receiving the data of the image to be displayed. Moreover, it can be understood for those skilled in the art that the brightness compensation function can be turned off when it is not necessary to perform the brightness compensation.

In some embodiments of the present disclosure, the step S102 includes: obtaining the grayscale difference of the initial grayscale values corresponding to adjacent two regions. Specifically, obtaining the grayscale difference of the initial grayscale values corresponding to every adjacent two pixel units.

In some embodiments of the present disclosure, in step S103, it is judged whether each grayscale difference is greater than the preset value. The preset value ranges from 1 to 10. In some embodiments, the preset value may be 1, 2, 3, 4, 5, 6, 7, 8, 9, or 10. For example, among adjacent two regions of the image to be displayed, an initial grayscale value of one region is 0 and an initial grayscale value of the other region is 255, then the grayscale difference between the above two regions is 255, and thus it is judged that the grayscale difference between the above two regions is greater than the preset value.

In some embodiments of the present disclosure, in step S104, adjacent two regions are divided into two sub-images in a case where the grayscale difference between every adjacent two regions is greater than the preset value. For example, if the initial grayscale value of one region is 0 and the initial grayscale value of the other region is 255 in two adjacent regions of the image to be displayed, then the grayscale difference between the two regions is 255, indicating that the grayscale difference between the two regions is greater than the preset value. Correspondingly, these two regions are divided into two sub-images.

In some embodiments of the present disclosure, in step S103, adjacent two regions are grouped into the same sub-image in case where the grayscale difference between the adjacent two regions is less than or equal to the preset value. That is, if the grayscale difference between adjacent two pixel units is less than or equal to the preset value, the two pixel units are grouped into the same sub-image.

In some embodiments of the present disclosure, in step S105, the distribution data of the sub-images include the number of the sub-images, distribution locations of the sub-images, and area of the sub-images with the same initial grayscale value. For example, when the image to be displayed is a checkerboard image, the image to be displayed includes multiple sub-images distributed in an array, and initial grayscale values of adjacent two sub-images are 0 and 255, respectively. In this case, the distribution data of the sub-images include the number and area of the sub-images with an initial grayscale value of 0 and 255, both of which are equal, and the sub-images with an initial grayscale value of 0 and 255 are alternately distributed along the row and column directions.

In some embodiments of the present disclosure, in step S105, the distribution data of the backlight partitions can be obtained according to the distribution data of the sub-images corresponding to the backlight partitions. For example, when the image to be displayed includes multiple black and white sub-images distributed alternately and at intervals, it is obtained that mini LEDs in regions of the backlight partitions corresponding to the white sub-images emit light, and mini LEDs in regions of the backlight partitions corresponding to the black sub-images do not emit light.

In some embodiments of the present disclosure, in step S106, the distribution data of the backlight partitions include the number, distribution locations, and area of light-emitting regions and non-light-emitting regions of the backlight partitions. For example, a checkerboard image corresponds to multiple backlight partitions distributed in an array, and among adjacent two backlight partitions, regions where mini LEDs in one backlight partition emit light are the light-emitting regions, and regions where mini LEDs in the other backlight partition do not emit light are the non-light-emitting regions. The light-emitting regions and the non-light-emitting regions are alternately distributed along the row and column directions, respectively. In this case, the distribution data of the backlight partitions include the number, distribution locations, and area of the light-emitting regions and the non-light-emitting regions, both of which are equal, and the light-emitting regions and the non-light-emitting regions are alternately distributed along the row and column directions, respectively. Thus, the type of the initial backlight image can be obtained according to the distribution data of the light-emitting regions and the non-light-emitting regions.

Figure 4:
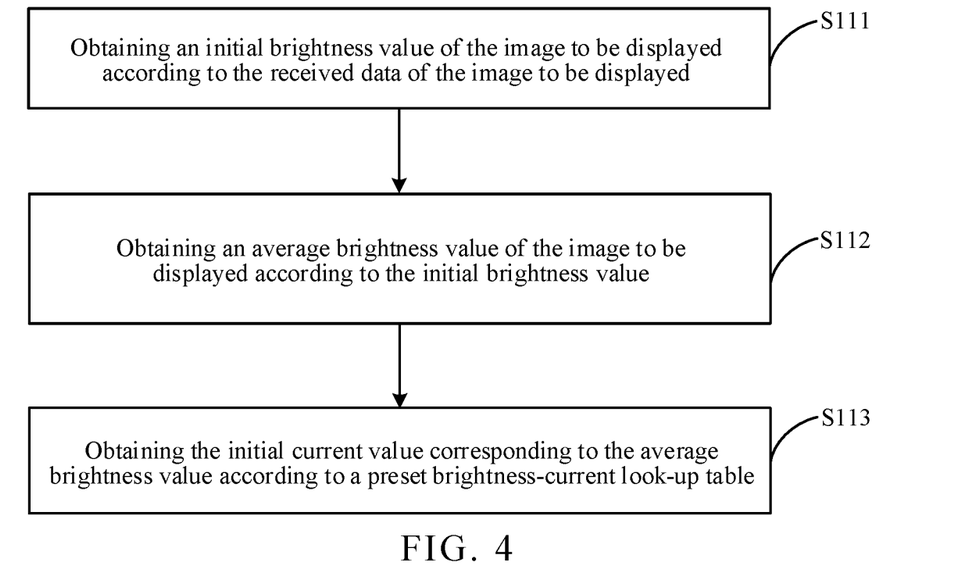
FIG. 4 is a flowchart of "obtaining an initial current value of the image to be displayed" of step S10 in FIG. 2.

Referring to FIG. 4, the step of obtaining the initial current value of the image to be displayed includes:

step S111, obtaining an initial brightness value of the image to be displayed according to the received data of the image to be displayed;

step S112, obtaining an average brightness value of the image to be displayed according to the initial brightness value; and step S113, obtaining the initial current value corresponding to the average brightness value according to a preset brightness-current look-up table.

In some embodiments of the present disclosure, the step S111 includes: obtaining initial grayscale values of all the sub-images of the image to be displayed according to the received data of the image to be displayed, so as to obtain the sub-images with initial grayscale values that are not 0, and thus obtaining initial brightness values corresponding to the sub-images with initial grayscale values that are not 0 in the image to be displayed.

In some embodiments of the present disclosure, the step S112 includes: obtaining an average brightness value of the image to be displayed according to the initial brightness values corresponding to multiple sub-images of the image to be displayed.

In some embodiments of the present disclosure, the step S113 includes: obtaining a preset brightness-current look-up table according to the average brightness value of the image to be displayed, so as to obtain the initial current value corresponding to the average brightness value.

In some embodiments of the present disclosure, in step S20, the image to be displayed corresponding to the type of the preset backlight image includes multiple sub-images distributed in an array, and initial grayscale values of adjacent two sub-images are 0 and 255, respectively. That is, the image to be displayed corresponding to the type of the preset backlight image is a checkerboard image. For example, the image to be displayed corresponding to the type of the preset backlight image may be a single color image, such as a red image, a blue image, a green image, a white image, or the like. Alternatively, the image to be displayed corresponding to the type of the preset backlight image may also be an image with a black background and white frame.

In some embodiments of the present disclosure, if the image to be displayed corresponding to the type of the preset backlight image is a checkerboard image, that is, the type of the preset backlight image includes light-emitting regions and non-light-emitting regions alternately distributed along the row and column directions, respectively. If the type of the initial backlight image also includes light-emitting regions and non-light-emitting regions alternately distributed along the row and column directions, respectively, indicating that the type of the initial backlight image is the same as the type of the preset backlight image.

In the embodiments of the present disclosure, different target current values of the image to be displayed are obtained corresponding to different types of preset backlight images. That is, the target current values of the image to be displayed corresponding to different types of preset backlight images may be the same or different.

In some embodiments of the present disclosure, in step S20, the current difference between the initial current value and the target current value is obtained to judge whether the initial current value is in a preset range (less than or equal to the preset threshold), thereby judging whether the initial brightness value of the image to be displayed is in the preset brightness range.

In some embodiment of the present disclosure, the preset threshold ranges from 1 mA to 10 mA. For example, the preset threshold may be 1 mA, 2 mA, 3 mA, 4 mA, 5 mA, 6 mA, 7 mA, 8 mA, 9 mA, or 10 mA. Preferably, the preset threshold is 5 mA.

Figure 5:
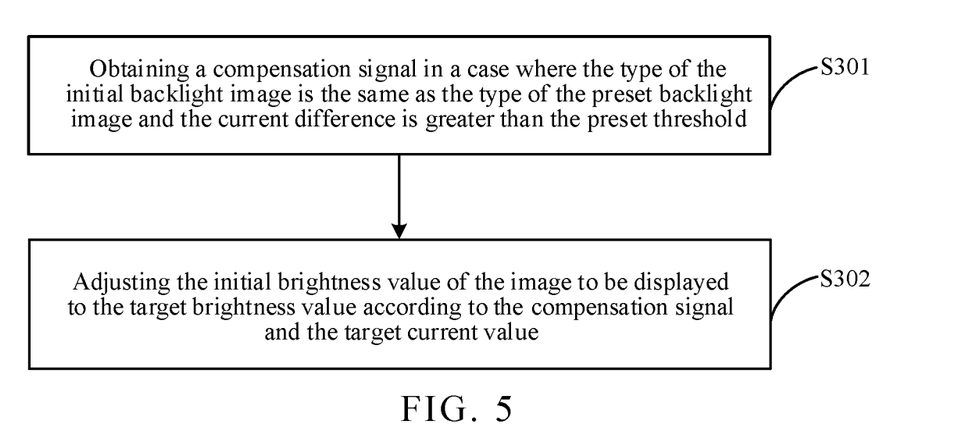
FIG. 5 is a flowchart of step S30 in FIG. 2.

Referring to FIG. 5, the step S30 includes:
step S301, obtaining a compensation signal in a case where the type of the initial backlight image is the same as the type of the preset backlight image and the current difference is greater than the preset threshold; and
step S302, adjusting the initial brightness value of the image to be displayed to the target brightness value according to the compensation signal and the target current value.

In some embodiments of the present disclosure, in step S301, if it is judged that the type of the initial backlight image is the same as the type of the preset backlight image, and the initial current value exceeds the preset brightness range (greater than the preset threshold), that is, the initial brightness value of the light-emitting regions in the type of the initial backlight image is not in the preset brightness range. In this case, the detection module transmits the compensation signal to the compensation module.

The initial brightness value of the light-emitting regions in the type of the initial backlight image being not in the preset brightness range, including cases where the initial brightness value of the light-emitting regions in the type of the initial backlight image is less than the target brightness value and the difference between the initial brightness value and the target brightness value is greater than the preset threshold, and the initial brightness value of the light-emitting regions in the type of the initial backlight image is greater than the target brightness value and the difference between the initial brightness value and the target brightness value is greater than the preset threshold.

Figure 6:
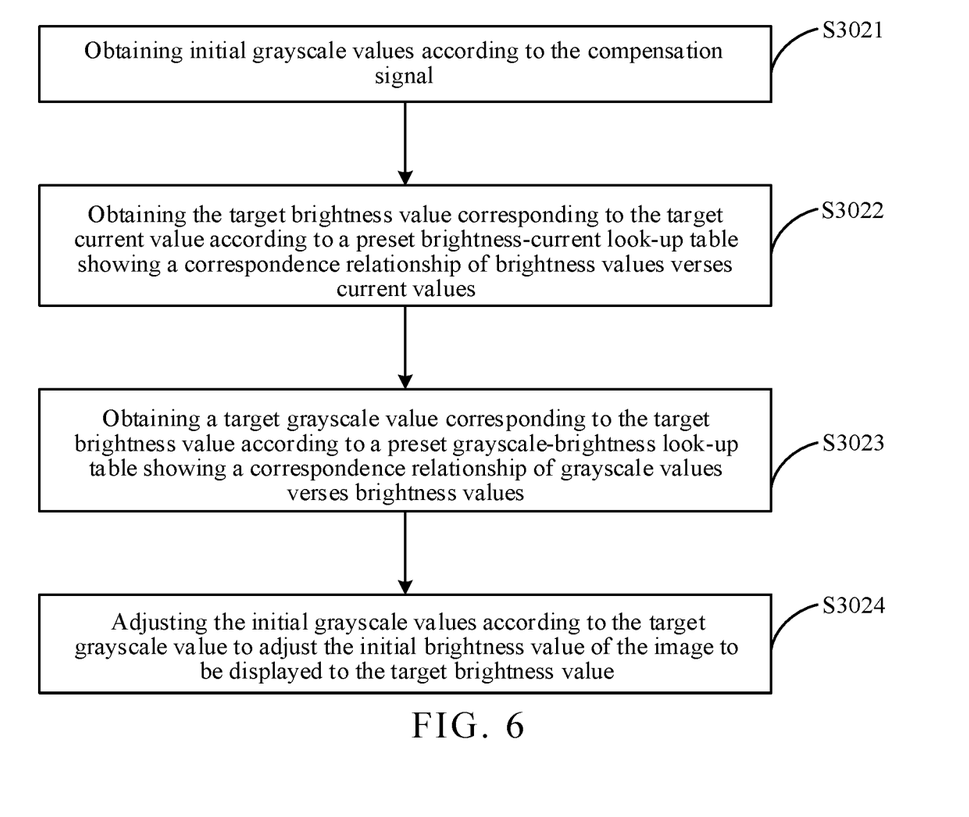
FIG. 6 is a flowchart of step S302 in FIG. 5.

Referring to FIG. 6, the step S302 includes:
step S3021, obtaining initial grayscale values according to the compensation signal;
step S3022, obtaining the target brightness value corresponding to the target current value according to a preset brightness-current look-up table showing a correspondence relationship of brightness values verses current values;
step S3023, obtaining a target grayscale value corresponding to the target brightness value according to a preset grayscale-brightness look-up table showing a correspondence relationship of grayscale values verses brightness values; and
step S3024, adjusting the initial grayscale value according to the target grayscale value to adjust the initial brightness value of the image to be displayed to the target brightness value.

In some embodiments of the present disclosure, in step S3021, the compensation module obtains the initial grayscale values of all the sub-images of the image to be displayed after the compensation module receives the compensation signal transmitted by the detection module.

In some embodiments of the present disclosure, before the step S3022, the driving method for the display device further includes: establishing the brightness-current look-up table showing the correspondence relationship of the brightness values verses the current values.

In some embodiments of the present disclosure, the initial grayscale values of all the sub-images of the image to be displayed on the display panel are adjusted according to the target brightness value corresponding to the target current value.

In some embodiments of the present disclosure, before the step S3023, the driving method for the display device further includes: establishing the grayscale-brightness look-up table showing the correspondence relationship of the grayscale values verses the brightness values.

In some embodiments of the present disclosure, the target brightness value of the preset backlight image is the target brightness value of the image to be displayed to be achieved. The step of obtaining the target grayscale value corresponding to the target brightness value according to the preset grayscale-brightness look-up table, that is, obtaining the target grayscale value corresponding to each sub-image of the image to be displayed.

In some embodiments of the present disclosure, in step S3024, the initial grayscale values of the image to be displayed on the display panel are adjusted to the target grayscale value, so that the initial brightness value of the image to be displayed is adjusted to the target brightness value.

In the embodiments of the present disclosure, the initial brightness value of the image to be displayed is adjusted to the target brightness value according to the type of the preset backlight image and the target current value of the image to be displayed, so as to achieve higher accuracy in brightness correction of display images.

In some embodiments of the present disclosure, the driving method for the display device further includes: displaying a target image according to the initial brightness value of the image to be displayed in a case where the type of the initial backlight image is different from the type of the preset backlight image and the current difference between the initial current value and the target current value is less than or equal to the preset threshold.

Specifically, the detection module can be used to compare the type of the initial backlight image with the type of the preset backlight image, and compare the initial current value with the target current value simultaneously. If the type of the initial backlight image is different from the type of the preset backlight image, the detection module does not generate the compensation signal, and thus the compensation module does not adjust the brightness of the display panel without receiving the compensation signal. Similarly, if the current difference between the initial current value and the target current value is less than or equal to the preset threshold, indicating that the initial brightness value of the image to be displayed is in the preset range. In this case, the detection module does not generate a compensation signal, and thus the compensation module does not adjust the brightness of the display panel without receiving the compensation signal.

In the driving method for the display device provided in the above-mentioned embodiments of the present disclosure, the type of the initial backlight image is obtained according to the received data of the image to be displayed, and the initial current value of the image to be displayed is obtained; it is judged whether the type of the initial backlight image is the same as the type of the preset backlight image, and whether the current difference between the initial current value and the target current value is greater than the preset threshold; and the initial brightness value of the image to be displayed is adjusted to the target brightness value in a case where the type of the initial backlight image is the same as the type of the preset backlight image and the current difference is greater than the preset threshold. Therefore, by the above-mentioned steps in the driving method for the display device, the present disclosure realizes higher accuracy in brightness correction of display images by adjusting the initial brightness value of the image to be displayed to the target brightness value according to the type of the preset backlight image and the target current value of the image to be displayed.

The above contents provide a detailed description to the driving method for the display device and the display device provided in the embodiments of the present disclosure. The description of the above embodiments is only intended to help understand core ideas of the present disclosure, and is not intended as a limitation on the scope of protection.

What is claimed is:

1. A driving method for a display device comprising:
    obtaining a type of an initial backlight image, and obtaining an initial current value of an image to be displayed;
    judging whether the type of the initial backlight image is the same as a type of a preset backlight image, and whether a current difference is greater than a preset threshold, wherein the current difference is a difference value between the initial current value and a target current value; and
    adjusting an initial brightness value of the image to be displayed to a target brightness value in a case where the type of the initial backlight image is the same as the type of the preset backlight image and the current difference is greater than the preset threshold.

2. The driving method for the display device of claim 1, wherein the step of obtaining the type of the initial backlight image comprises:
    obtaining initial grayscale values of different regions of the image to be displayed;
    obtaining grayscale differences corresponding to the initial grayscale values of adjacent regions;
    judging whether the grayscale differences are greater than a preset value;
    dividing adjacent two regions into two sub-images in a case where a grayscale difference of the adjacent two regions is greater than the preset value;
    obtaining distribution data of a plurality of backlight partitions according to distribution data of the sub-images; and
    obtaining the type of the initial backlight image according to the distribution data of the backlight partitions.

3. The driving method for the display device of claim 2, wherein the image to be displayed corresponding to the type of the preset backlight image comprises a plurality of sub-images distributed in an array, and the initial grayscale values of adjacent two sub-images are 0 and 255, respectively.

4. The driving method for the display device of claim 1, wherein the step of obtaining the initial current value of the image to be displayed comprises:
    obtaining the initial brightness value of the image to be displayed;
    obtaining an average brightness value of the image to be displayed according to the initial brightness value; and
    obtaining the initial current value corresponding to the average brightness value according to a preset brightness-current look-up table.

5. The driving method for the display device of claim 1, wherein the driving method for the display device further comprises:
    displaying a target image according to the initial brightness value in a case where the type of the initial backlight image is different from the type of the preset backlight image.

6. The driving method for the display device of claim 1, wherein the driving method for the display device further comprises:
    displaying a target image according to the initial brightness value in a case where the current difference is less than or equal to the preset threshold.

7. The driving method for the display device of claim 1, wherein the step of adjusting the initial brightness value of the image to be displayed to the target brightness value in a case where the type of the initial backlight image is the same as the type of the preset backlight image and the current difference is greater than the preset threshold comprises:
    obtaining a compensation signal in a case where the type of the initial backlight image is the same as the type of the preset backlight image and the current difference is greater than the preset threshold; and
    adjusting the initial brightness value of the image to be displayed to the target brightness value according to the compensation signal and the target current value.

8. The driving method for the display device of claim 7, wherein the step of adjusting the initial brightness value of the image to be displayed to the target brightness value according to the compensation signal and the target current value comprises:
    obtaining initial grayscale values according to the compensation signal;
    obtaining the target brightness value corresponding to the target current value according to a preset brightness-current look-up table showing a correspondence relationship of brightness values verses current values;
    obtaining a target grayscale value corresponding to the target brightness value according to a preset grayscale-brightness look-up table showing a correspondence relationship of grayscale values verses brightness values; and
    adjusting the initial grayscale values according to the target grayscale value to adjust the initial brightness value of the image to be displayed to the target brightness value.

9. The driving method for the display device of claim 1, wherein the preset threshold ranges from 1 mA to 10 mA.

10. The driving method for the display device of claim 2, wherein the step of obtaining initial grayscale values of different regions of the image to be displayed comprises:
    obtaining the initial grayscale values of a plurality of pixel units corresponding to the image to be displayed, and dividing the image to be displayed into a plurality of sub-images according to differences of the initial grayscale values of the pixel units.

11. The driving method for the display device of claim 2, wherein the step of obtaining grayscale differences corresponding to the initial grayscale values of adjacent regions comprises:
    obtaining a grayscale difference of the initial grayscale values between every adjacent two regions.

12. The driving method for the display device of claim 2, wherein the preset value ranges from 1 to 10.

13. The driving method for the display device of claim 2, wherein the distribution data of the sub-images comprise the number of the sub-images, distribution locations of the sub-images, and area of the sub-images with a same initial grayscale value.

14. The driving method for the display device of claim 2, wherein the distribution data of the backlight partitions comprise the number, distribution locations, and area of light-emitting regions and non-light-emitting regions of the backlight partitions.

15. The driving method for the display device of claim 1, wherein the step of obtaining the type of the initial backlight image comprises:
- obtaining initial grayscale values of a plurality of pixel units corresponding to the image to be displayed, and dividing the image to be displayed into a plurality of sub-images according to differences of the initial grayscale values of the pixel units;
- obtaining a grayscale difference of the initial grayscale values between every adjacent two regions;
- judging whether the grayscale difference is greater than the preset value, wherein the preset value ranges from 1 to 10;
- dividing adjacent two regions into two sub-images in a case where the grayscale difference of the adjacent two regions is greater than the preset value;
- obtaining distribution data of a plurality of backlight partitions according to distribution data of the sub-images, wherein the distribution data of the sub-images comprise the number of the sub-images, distribution locations of the sub-images, and area of the sub-images with a same initial grayscale value, and the distribution data of the backlight partitions comprise the number, distribution locations, and area of light-emitting regions and non-light-emitting regions of the backlight partitions; and
- obtaining the type of the initial backlight image according to the distribution data of the backlight partitions.

16. The driving method for the display device of claim 1, wherein the step of obtaining the initial current value of the image to be displayed comprises:
- obtaining initial brightness values corresponding to a plurality of sub-images with initial grayscale values that are not 0 in the image to be displayed;
- obtaining an average brightness value of the image to be displayed according to the initial brightness values corresponding to the plurality of sub-images; and
- obtaining the initial current value corresponding to the average brightness value.

17. The driving method for the display device of claim 1, further comprising:
displaying a target image according to the initial brightness value of the image to be displayed in a case where the type of the initial backlight image is different from the type of the preset backlight image and the current difference is less than or equal to the preset threshold.

18. A display device comprising a display panel, a backlight module, and a driving circuit, wherein the display panel and the backlight module are electrically connected to the driving circuit, and the driving circuit comprises:
- a detection module electrically connected to the display panel and the backlight module, wherein the detection module is configured to obtain a type of an initial backlight image, and obtain an initial current value of the image to be displayed;
- a comparison module electrically connected to the detection module, wherein the comparison module is configured to judge whether the type of the initial backlight image is the same as a type of a preset backlight image, and whether a current difference is greater than a preset threshold, wherein the current difference is a difference value between the initial current value and a target current value; and
- a compensation module electrically connected to the display panel, the detection module, and the comparison module, wherein the compensation module is configured to adjust an initial brightness value of the image to be displayed to a target brightness value according to the target current value and to enable the display panel to display a target image according to the target brightness value in a case where the type of the initial backlight image is the same as the type of the preset backlight image and the current difference is greater than the preset threshold.

19. The display device of claim 18, wherein the driving circuit further comprises a controlling module electrically connected to the display panel, the detection module, and the compensation module, wherein the controlling module is configured to turn on a brightness compensation function when brightness compensation is needed, and turn off the brightness compensation function when the brightness compensation is not needed.

20. The display device of claim 18, wherein the preset threshold ranges from 1 mA to 10 mA.

* * * * *